Figure 9:
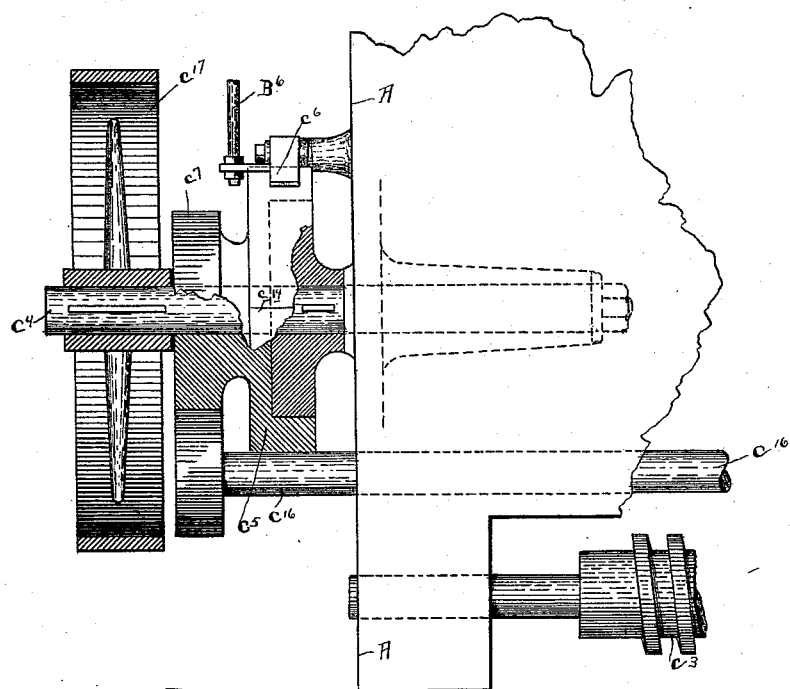

(No Model.) 3 Sheets—Sheet 1.
F. H. BULTMAN.
AUTOMATIC GEAR CUTTING AND MILLING MACHINE.
No. 539,792. Patented May 28, 1895.
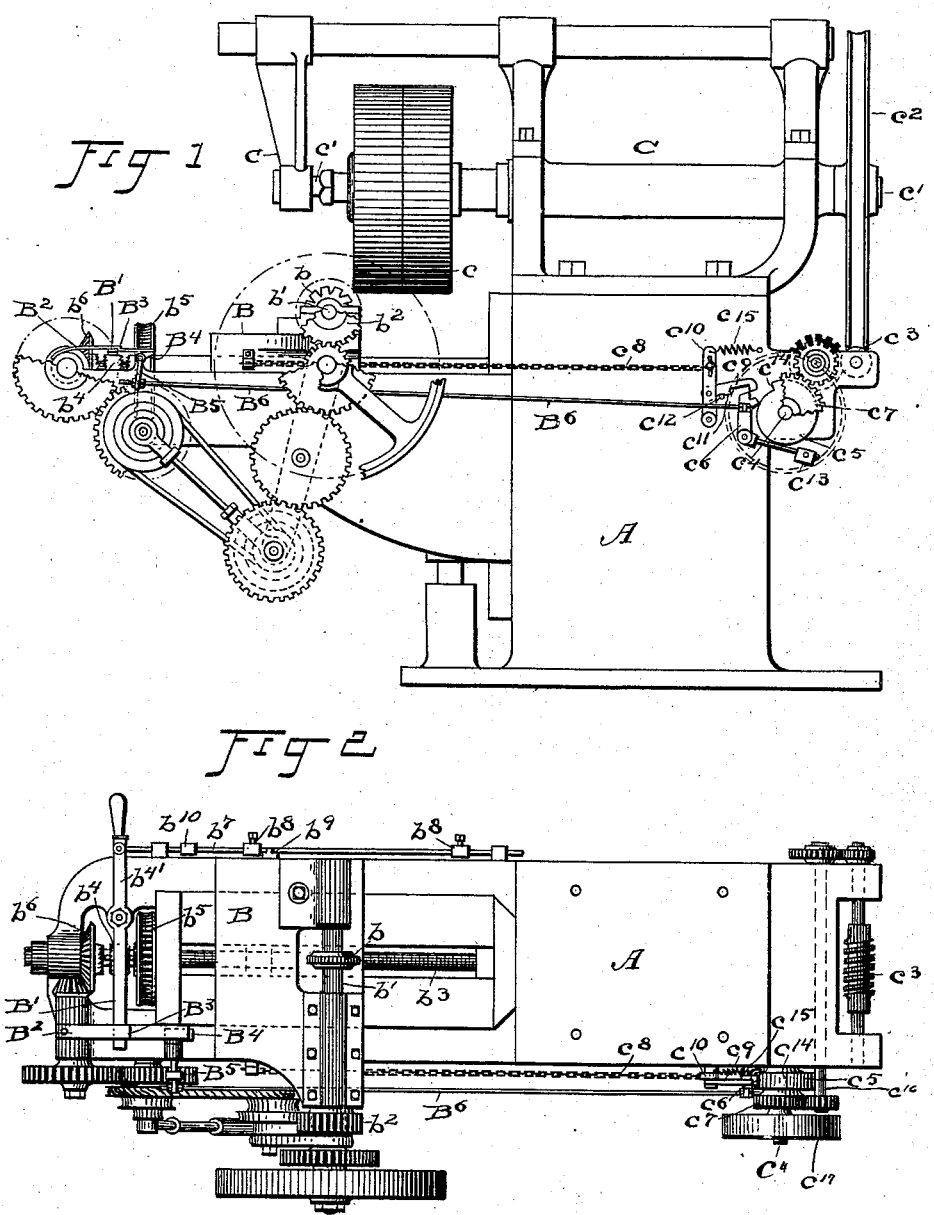

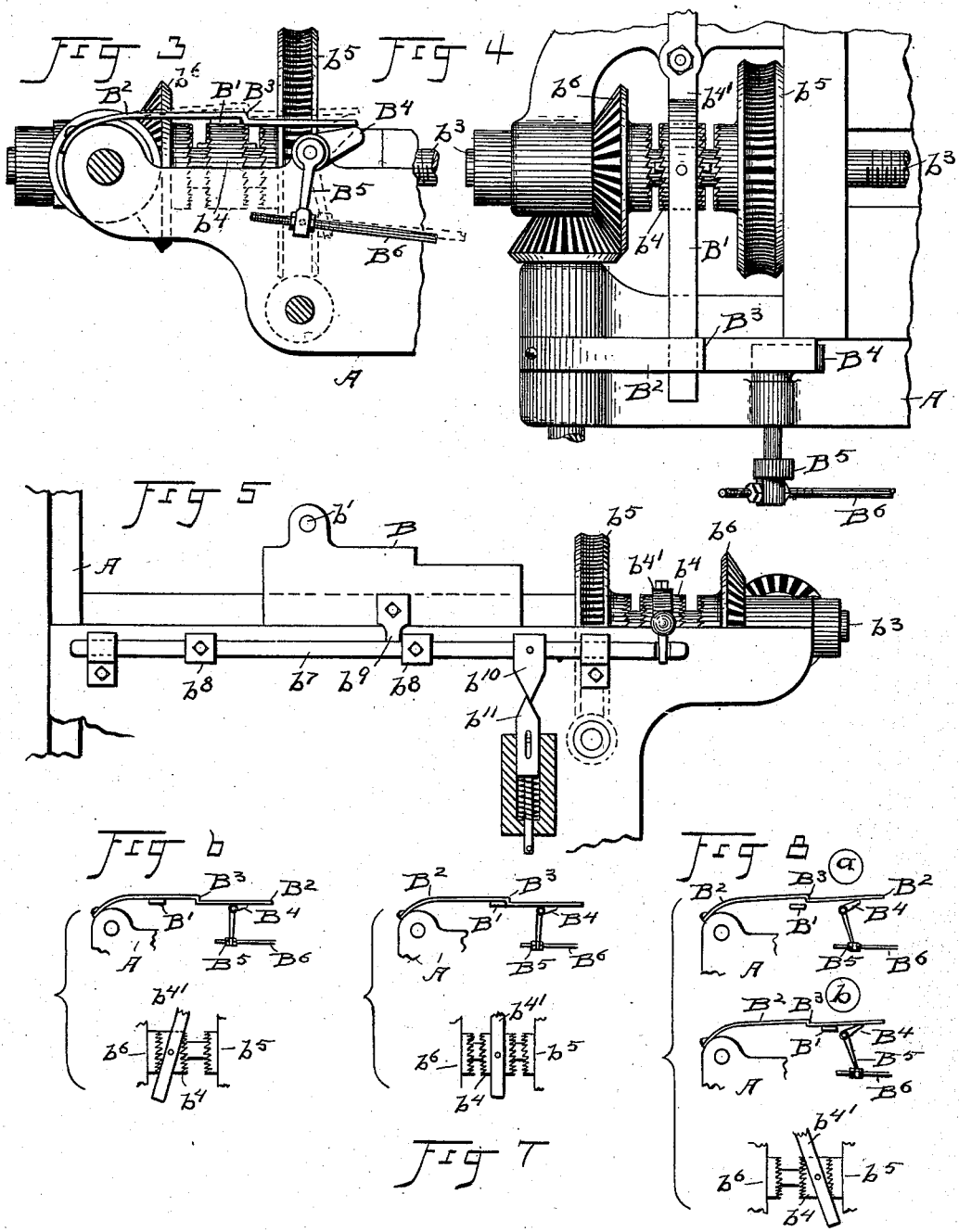

(No Model.) 3 Sheets—Sheet 3.

F. H. BULTMAN.
AUTOMATIC GEAR CUTTING AND MILLING MACHINE.

No. 539,792. Patented May 28, 1895.

Witnesses
Alfred J. Symms Jr.
Jas. L. Durick

Inventor
Frederick H. Bultman
By N. J. Amstutz
Attorney

UNITED STATES PATENT OFFICE.

FREDERICK H. BULTMAN, OF CLEVELAND, OHIO.

AUTOMATIC GEAR-CUTTING AND MILLING MACHINE.

SPECIFICATION forming part of Letters Patent No. 539,792, dated May 28, 1895.

Application filed January 5, 1894. Serial No. 495,807. (No model.)

*To all whom it may concern:*

Be it known that I, FREDERICK H. BULTMAN, a citizen of the United States, residing at Cleveland, in the county of Cuyahoga and State of Ohio, have invented certain new and useful Improvements in Controllers for Automatic Cutting-Machines; and I do hereby declare the following to be a full, clear, and exact description of the invention, such as will enable others skilled in the art to which it appertains to make and use the same.

My invention relates to improvements in automatic gear cutting machines, milling machines, &c., and it relates to such features of adaptation as are herein instanced by the description and drawings, and more especially pointed out in the annexed claims.

My invention is adapted to any class of tool or machine wherein the work is automatically moved into new positions for successive operations thereon by any suitable cutting mechanism, whether such tool is of one design or another. In all machine tools of this class, where the work is successively moved into predetermined positions, it is absolutely essential that the cutting mechanism which is designed to operate upon such work, should not begin to cut until the work is in its proper position, and so long as the work is not so placed, the cutting device should be held inoperative without recourse to an entire stopping of the source of power. In the present practice no such safeguards are provided. Hence a great many pieces of work are destroyed, because the mechanism which moves the work into a new position becomes inoperative, or faulty in the regularity of its motion, and leaves the work in a wrong position, so that the cutters destroy it.

My invention aims to overcome these disadvantages, and to provide a reliable safeguard to the protection of work, thus insuring greater speed, and a better and a more accurate class of work than has hitherto been attainable.

With these ends in view, I herewith illustrate in the accompanying drawings such instances of adaptation which show the principles involved in my invention, as adapted in this instance to gear cutting machines.

Figure 1 is a side elevation of a machine, showing adaptations of my features of invention. Fig. 2 is a plan view of Fig. 1. Fig. 3 is an enlarged elevation of the locking device, and Fig. 4 is a plan view thereof. Fig. 5 is an elevation of a tripping device. Figs. 6, 7, and 8 are diagrammatic views of the different positions of my safety device. Fig. 9 is a plan view, partly in section, of the shaft $c^4$, clutch $c^5$, and shaft $c^{16}$.

In the instances of adaptation shown in the drawings, there is provided any suitable bed or support, A, upon which the carriage, B, moves to and fro. A support, C, holds the work, $c$, contiguous to the path of travel of the carriage. It should be understood at this point that it is immaterial whether the movable carriage holds the work, or the cutter or cutters. The carriage, B, in this instance is provided with a suitable cutting device, $b$, which may be driven in any suitable manner through the spindle, $b'$, and gear, $b^2$. The work, $c$, is supported upon an arbor, $c'$, which, at its rear end has secured thereon a worm gear, $c^2$, which engages a worm, $c^3$, it being in turn connected through suitable reducing gears and shaft $c^{16}$, to a clutch shaft, $c^4$, upon which are a friction clutch, $c^5$, and gear $c^7$ which are periodically held inoperative by a dog, $c^6$. This clutch shaft is driven through the pulley $c^{17}$, located adjacent the gear wheel, $c^7$, in any suitable manner.

The moving of the carriage, B, either forward or backward is accomplished in the usual manner by a screw, $b^3$, Fig. 4, engaging a nut of the carriage. When the screw is rotated in one direction, the carriage moves forward, and when it rotates in the opposite direction, the carriage, B, moves backward. Upon the screw, $b^3$, is placed a movable clutch, $b^4$, which is free to slide on the same, and yet rotate with it, and when moved toward the carriage it engages the toothed portion of the worm gear, $b^5$, which then rotates the screw, $b^3$, through the clutch, $b^4$, and moves the carriage forward. When not engaged by the clutch, the worm gear rotates loosely on the screw.

When the clutch, $b^4$ moves away from the carriage, it engages the toothed portion of the bevel gear, $b^6$, which then rotates the screw, $b^3$ in an opposite direction, and moves the carriage away from the work. When the bevel gear is not engaged by the clutch, it rotates loosely on the screw. The clutch, $b^4$, is operated by the carriage, B, through a trip rod $b^7$, which is connected to one end of the clutch arm, $b^{4'}$. Upon this rod are adjustable blocks, $b^8$, which are engaged at each end of the movement of the carriage, B, by a projection, $b^9$. These blocks and the projection are just sufficient in their action to slightly move the trip rod, $b^7$, which carries a locking and accelerating block, $b^{10}$, which is V shaped, and engages a similar block, $b^{11}$, held in a suitable casing of the main bed, A. The block, $b^{11}$, is spring pressed, for the purpose of carrying the trip rod, $b^7$, its proper distance in either direction to reverse the rotation of the screw, $b^3$, through the clutch, $b^4$, since the movement of the carriage, B, either backward or forward, is but sufficient to slightly move the trip rod and throw off the clutch, $b^4$, when the same would stand leaving the carriage idle, unless the spring pressed block, $b^{11}$, moved it into engagement again with the source of power.

The work, in machines of this class, must periodically be moved into a new position, for the cutting device, and this is done automatically by the worm gear at the rear end of the arbor shaft which supports the work, through the clutch, $c^5$. This clutch is made operative, when the cutters have moved away from the work, and the entire movement of the work, into a new position, must be accomplished before the cutters again move into engagement with the same. Unfortunately, this does not always follow, for various reasons; such as the difference in the timing of the trip rod and the chain, $c^8$, which operates the dog, $c^6$, as well as the failure of the friction clutch, $c^5$, or its connected mechanism or for any other reasons. The manner of operating the mechanism in this special instance which changes the position of the work, is as follows:

Connected to the carriage, B, is a chain or any connections, $c^8$, which is not taut until the carriage and its cutters are free from the work, in the backward movement thereof. At such time the chain, $c^8$, disengages the dog, $c^6$, from the friction clutch, $c^5$, which then is free to rotate, and thus move the work into a new position, as the chain, $c^8$, moves the dog, $c^6$, out of engagement, through a secondary pawl, $c^9$, which is pivoted to a lever, $c^{10}$, which is itself pivoted to a suitable support from the main frame, A, the pawl, $c^9$, through a projection, $c^{11}$, engages a pin, $c^{12}$, which disengages the dog, $c^6$ therefrom, and allows it free to again engage the clutch tooth $c^{14}$, and hold it inoperative.

No more than one revolution can be made by the clutch, since the dog, $c^6$, is always ready, unless prevented, to drop into the ratchet tooth, $c^{14}$, by the gravity of weight, $c^{13}$, before the end of each revolution, if not held back for any cause or reason. When held back, the work continues to move, while the cutting mechanism also moves into the work thus injuring the same. Contingencies of this kind are effectually guarded against by my safety device. As the carriage, B, again moves forward the chain, $c^8$, slackens sufficiently to allow a spring, $c^{15}$, to draw the lever, $c^{10}$, and drop the pawl $c^9$ into engagement again with the dog, $c^6$, ready for a succeeding operation. This description, somewhat extended, is deemed necessary so that a clear comprehension is obtained of all the coacting parts of the device as herein instanced, to more readily comprehend the special features of the safeguard or controlling device which I have designed, and which is applicable to the instance of adaptation herein shown and described, as well as other analogous adaptations not referred to, the operation of which, in the instance of the before described action, is as follows:

The lever for operating the clutch $b^4$, has a forward projection, B' which moves in close engagement with a spring, $B^2$. This spring has an off-set or stop, $B^3$, and under its forward end is placed a trip lever $B^4$, which is operated by a short crank arm, $B^5$, which in turn is adjustably connected to a connecting rod, $B^6$, which extends to the dog, $c^6$, to which it is also adjustably connected if so desired. As the dog, $c^6$, moves forward to stop the spacing mechanism, the trip lever, $B^4$, is moved up, thus raising the free end of the spring, $B^2$, which allows the clutch lever extension, B', to become disengaged from the off-set, or stop, $B^3$, and move forward to cause the clutch, $b^4$, to engage the worm wheel, $b^5$, which causes the carriage to move toward the work, but not until the spacing device has come to rest as evidenced by the movement of the dog, $c^6$. When the dog, $c^6$, is drawn away again by the carriage, B, the trip lever, $B^4$, moves away from the spring, so that when the carriage has reached its farthest point forward, the clutch, $b^4$, is reversed, and the carriage moves backward. As the clutch, $b^4$, again becomes inoperative, the clutch lever projection, B', retains the same in this position through the stop, $B^3$. The projection, B', is held by the stop, $B^3$, until such time as the work has moved into a new position and is locked therein by the dog $c^6$, when the stop, $B^3$, is engaged and the clutch, $b^4$, is again free to move forward and make the connection which will move the carriage toward the work.

The essential features of my device, whether used in this adaptation or otherwise, are absolute certainty of action, the greatest simplicity and number of parts, with the utmost efficiency of operation.

I do not, of course, limit myself to the specific details of construction as shown, since it is obvious that such constructive details could be varied without departing from the spirit of my invention.

What I claim is—

1. A holder for work, a spacing mechanism in connection with a source of power, a clutch and clutch operating mechanism interposed between the source of power and the spacing mechanism; a cutting device, reversible means for moving the same with its supporting slide to and from the work, a locking device for the spacing mechanism clutch, connected to the cutter slide, whereby the clutch is unlocked as the cutter slide is drawn away from the work and is again locked as the cutting device returns toward the work, a reversing lever controlling the to and fro movements of the cutting slide, an automatic stop therefor, connections from the stop to the clutch locking device, whereby the reversing lever is maintained in a central or inoperative position, so long as the clutch of the spacing device is unlocked, the parts being combined, substantially as set forth.

2. Feeding mechanism for a cutter slide or the like, comprising a reversing lever controlling such feeding mechanism, a holder for work contiguous to the cutter slide, a clutch and power connections for intermittently moving the said work holder, a clutch dog, connections from the same to the cutter slide and other connections such as a rod or the like therefrom to the stop for the reversing lever of the feeding mechanism, whereby, the inoperativeness of the clutch dog maintains the said reversing lever inactive, the parts being combined, substantially as set forth.

3. A feeding mechanism for a cutter slide, a reversing lever and a stop therefor, a clutch and dog for a spacing device adapted to actuate a work holder, connections such as suitable links, chains or rods or the like, from the dog to the cutter slide and reversing lever stop, whereby said lever is automatically held inoperative, so long as the clutch dog is inoperative, the parts being combined, substantially as set forth.

4. A feeding mechanism for a reciprocating slide, a reversing lever therefor a spring or the like adapted to hold the said lever inoperative, a clutch device, a dog therefor, means for rotating the clutch, a stop therein, and suitable chain, cable or rod or the like connections from such dog to the reversing lever and the slide, whereby the said lever is released from the spring when the dog engages the clutch stop, the parts being combined, substantially as set forth.

5. A clutch, a stop therein, a dog engaging the clutch, a movable slide, a reversing lever therefor, a spring or the like for holding such lever in its middle or inoperative position, suitable flexible or rigid connections from the clutch dog to the reversing lever, whereby the same is automatically released from the spring when the dog engages the clutch stop, but is held from releasing the same, so long as the dog does not engage the stop, the parts being combined, substantially as set forth.

In testimony whereof I affix my signature in presence of two witnesses.

FREDERICK H. BULTMAN.

Witnesses:
N. S. AMSTUTZ,
C. H. GALE.